US006862556B2

United States Patent
Feola et al.

(10) Patent No.: US 6,862,556 B2
(45) Date of Patent: Mar. 1, 2005

(54) SYSTEM AND METHOD FOR ASSOCIATING HISTORICAL INFORMATION WITH SENSORY DATA AND DISTRIBUTION THEREOF

(75) Inventors: Christopher J. Feola, Grapevine, TX (US); James C. Jennings, IV, Dallas, TX (US)

(73) Assignee: Belo Company, Wilmington, DE (US)

( * ) Notice: Subject to any disclaimer, the term of this patent is extended or adjusted under 35 U.S.C. 154(b) by 315 days.

(21) Appl. No.: 09/905,406

(22) Filed: Jul. 13, 2001

(65) Prior Publication Data

US 2002/0111773 A1 Aug. 15, 2002

Related U.S. Application Data

(60) Provisional application No. 60/218,555, filed on Jul. 13, 2000.

(51) Int. Cl.[7] ............................................. G06F 19/00
(52) U.S. Cl. ........................................... 702/187; 386/4
(58) Field of Search .................... 702/187; 715/517, 715/530; 369/47.1, 47.13; 382/276, 300, 317; 345/629, 689, 723; 360/5, 18; 386/4; 358/1.1, 1.2, 1.4; 709/200, 201; 713/183, 184

(56) References Cited

U.S. PATENT DOCUMENTS

| | | | |
|---|---|---|---|
| 4,725,815 A | 2/1988 | Mitchell et al. | 340/347 |
| 4,857,901 A | 8/1989 | Lathrop | 340/703 |
| 4,941,190 A | 7/1990 | Joyce | 382/54 |
| 5,003,307 A | 3/1991 | Whiting et al. | 341/51 |
| 5,016,009 A | 5/1991 | Whiting et al. | 341/67 |
| 5,138,465 A | 8/1992 | Ng et al. | 358/153 |
| 5,408,328 A | 4/1995 | Boliek et al. | 358/261.4 |

(List continued on next page.)

FOREIGN PATENT DOCUMENTS

| | | | |
|---|---|---|---|
| EP | 0909088 A1 | 2/1998 | |
| EP | 0 892 545 A2 | 1/1999 | |
| JP | 7023244 | 6/1993 | |
| JP | 11041449 | 7/1997 | |
| JP | 11 187261 | 7/1999 | |
| WO | WO 92/05556 | 4/1992 | |
| WO | WO 98/36566 | 8/1998 | |
| WO | 0 911 829 A1 * | 4/1999 | ......... G11B/27/031 |
| WO | WO 99/22336 | 5/1999 | |
| WO | PCT/US01/41367 | 7/2003 | |

OTHER PUBLICATIONS

Lisa–Mingo et al, "A Library of Memory Controllers for an Image Processing Prototyping System," 1998 IEEE, pp. 188–193.

Zhu, et al, "Image Coding by Folding," 1997 IEEE, pp. 665–668.

Helsingius, et al, "A GenLOT–Based Progressive Image Coder for Low Resolution Images,"1998 IEEE, pp. 312–316.

(List continued on next page.)

*Primary Examiner*—Patrick Assouad
(74) *Attorney, Agent, or Firm*—Jenkens & Gilchrist, PC

(57) ABSTRACT

Historical data elements and historical information may be generated based on input parameters and/or functional operations being applied to the sensory data or content. In one embodiment, at least one historical data element is concatenated to a sensory data element, and the historical information is maintained. The sensory data, historical data elements, and historical information may be stored in a single datafile. A recording device may record the sensory data and input parameters. The recording device may apply or encode the historical data elements to the sensory data. Alternatively, a post-processing system may receive the sensory data with or without the historical information and encode the sensory data and historical data elements into a datafile. The datafile may be communicated across a network, possibly via a parser, to licensees or consumers of the content.

42 Claims, 8 Drawing Sheets

U.S. PATENT DOCUMENTS

| | | | |
|---|---|---|---|
| 5,448,307 A | 9/1995 | Gelissen et al. | 348/584 |
| 5,485,568 A | 1/1996 | Venable et al. | 395/155 |
| 5,526,025 A | 6/1996 | Selwan et al. | 345/200 |
| 5,548,663 A | 8/1996 | Sekine et al. | 382/164 |
| 5,572,607 A | 11/1996 | Behrends | 382/274 |
| 5,666,503 A | 9/1997 | Campanelli et al. | 345/356 |
| 5,668,548 A | 9/1997 | Bakhmutsky | 341/67 |
| 5,754,805 A | 5/1998 | Gallup et al. | 395/376 |
| 5,765,176 A | 6/1998 | Bloomberg | 707/514 |
| 5,768,426 A | 6/1998 | Rhoads | 382/232 |
| 5,808,630 A | 9/1998 | Pannell | 345/514 |
| 5,809,160 A | 9/1998 | Powell et al. | 382/100 |
| 5,828,383 A | 10/1998 | May et al. | 345/507 |
| 5,850,346 A | 12/1998 | Barrus | 364/748.01 |
| 5,892,596 A | 4/1999 | Nonaka et al. | 358/538 |
| 5,977,992 A | 11/1999 | Branscomb | 345/507 |
| 5,978,523 A | 11/1999 | Linford et al. | 382/305 |
| 6,002,404 A | 12/1999 | Ideyama | 345/418 |
| 6,021,196 A | 2/2000 | Sandford, II et al. | 380/4 |
| 6,032,156 A | 2/2000 | Marcus | 707/104 |
| 6,044,370 A | 3/2000 | Anfindsen | 70/74 |
| 6,047,374 A | 4/2000 | Barton | 713/150 |
| 6,476,826 B1 * | 11/2002 | Plotkin et al. | 345/723 |
| 6,477,315 B1 * | 11/2002 | Ohomori | 386/55 |
| 6,489,969 B1 * | 12/2002 | Garmon et al. | 345/723 |
| 6,490,370 B1 * | 12/2002 | Krasinski et al. | 382/195 |
| 6,567,119 B1 * | 5/2003 | Parulski et al. | 348/207.2 |
| 6,567,980 B1 * | 5/2003 | Jain et al. | 725/61 |
| 6,621,504 B1 * | 9/2003 | Nadas et al. | 345/723 |
| 6,674,955 B2 * | 1/2004 | Matsui et al. | 388/52 |
| 2002/0025067 A1 | 2/2002 | Tomaru | 382/162 |
| 2003/0091329 A1 * | 5/2003 | Nakata et al. | 386/52 |
| 2003/0179297 A1 * | 9/2003 | Parulski et al. | 348/207.2 |

OTHER PUBLICATIONS

Swanson, et al, "Robust Data Hiding for Images," 1996 IEEE, pp. 37–40.

Cheung, et al, "Smart Pixel VLSI Architecture for Embedded Zerotree Wavelet Coding," Fifth International Symposium on Signal Processing and its Applications, ISSPA, Aug. 1999, pp. 693–696.

Ansari, et al, "Near–Lossless Image Compression Techniques," Department of Electrical Engineering and Computer Science, University of Illinois at Chicago, SPIE, vol. 3309 '97.

Sandford, et al., "The Data Embedding Method," SPIE, vol. 2615, '96, pp. 226–259.

Wu and Tsai, "Embedding of any Type of Data in Images based on a Human Visual Model and Multiple–Based Number Conversion,", Elsevier Science B.V., '99, pp. 1511–1517.

Fridrich, Jiri, "Robust Bit Extraction from Images," 1999 IEEE, pp. 536–540.

Wu and Tsai, "Data Hiding in Images Via Multiple–Based Number Conversion and Lossy Compression," 1998 IEEE, pp. 1406–1412.

Peng, Zhisi, "Turbo Codes for Image Transmission—A Joint Channel and Source Decoding Approach," Dissertation, Apr., 1999, pp. 1–150.

"Concealing Data Within a Bitmap," *IBM Technical Disclosure Bulletin*, vol. 37, No. 2B, Feb. 1, 1994, pp. 413–414, XP000433895.

"Multi–Search of Video Segments Indexed by Time–Aligned Annotations of Video Content," *Research Disclosure*, No. 431, Mar. 1, 2000, pp. 603–614, XP001048494.

Tichy, W. F., "RCS–A System for Version Control," *Software–Practice & Experience*, John Wiley & Sons, Ltd., Chichester, G.B., vol. 15, No. 7, Jul. 1985, pp. 637.654, XP001042031.

* cited by examiner

SYSTEM AND METHOD FOR ASSOCIATING HISTORICAL INFORMATION WITH SENSORY DATA AND DISTRIBUTION THEREOF

CROSS-REFERENCE TO RELATED APPLICATION

This patent application is related to and claims priority from U.S. Provisional Patent Application No. 60/218,555, entitled "BIT-TAGGED DATA", field Jul. 13, 2000, which is hereby incorporated by reference herein its entirety.

BACKGROUND OF THE PRESENT INVENTION

1. Field of the Invention

The present invention relates generally to data content, and, more specifically, associating historical information with sensory data during collection and editing processes, and distribution thereof.

2. Description of the Related Art

Information has become quintessential in what has become a digital era. Content providers, such as news sources, gather, prepare, publish, and distribute the information or content. The content may include text, photographs, graphics, video, audio, aural, and/or other sensory data.

To allow for distribution of the content from content providers to content consumers, network infrastructure has evolved. The advent of the Internet has made the content produced by the content providers accessible around the globe. Bandwidth of wireless networks, such as cellular telephone networks, has also dramatically increased to allow for distribution of content other than strictly voice. Other content may include text and images. Satellite networks have also increased bandwidth to communicate content to consumers.

While the network infrastructure has evolved, so too has devices that connect to the networks. Where it was once only possible to access the content on traditional personal computers, wireless devices, such as cellular telephones and personal digital assistants (PDA's), have evolved to access content on the Internet. Traditional televisions have become interactive and able to display content other than simple broadcast images. Satellite communication devices, such as digital radios, are also capable of receiving content other than audio.

Because of the variety of devices and distribution channels that have become available, content providers struggle to provide the content (i) for each of the different distribution channels, and (ii) for each of the devices operable to receive different data formats, generally due to the devices having certain hardware characteristics. For example, a news media that provides news content to newspaper, magazine, television, Internet, and wireless consumers faces a significant challenge to gather, edit, format, store, publish, and distribute the content or sensory data (e.g., photograph) for each distribution channel and device type.

Each of the steps, gathering, editing, formatting, storing, publishing, and distributing, includes many processes. For example, the formatting step includes formatting the content for each of the different distribution channels and devices. For example, a photograph requires high resolution for print and broadcast, but low resolution for Internet and wireless distribution due to limited bandwidth of the network and is display resolution of the display device. Cropping of the photograph, too, may be different for the different devices as a cellular telephone has a smaller display than does a computer monitor.

Given that the content is produced different for the different distribution channels and devices, the content provider utilizes personnel that spends much time and money to format and edit the content using traditional editing and publishing techniques. Traditional editing and publishing techniques basically include: (i) modifying or editing raw data created for different distribution channels, (ii) specifying particular distribution channels for each file type, (iii) distributing the content, and (iv) storing the datafiles according to file type.

In practice, it is not uncommon for the content providers to reuse or "repurpose" the content in relation to different stories for many years. However, the raw data is often lost due to storage space concerns, necessity, and/or organizational policies. Once the raw data is lost, it may be impossible to recreate or obtain adequate reproductions to repurpose the content for the different stories. In other words, it may not be possible to simply undo editing that has been performed on the content once original or early versions of the content is lost. For example, a photograph may originally include two people. The photograph may thereafter be cropped to exclude on of the people. If at a future date an editor wants to include the photograph with both people, it is not possible without having the original content (or copy thereof) with both people to start the editing process again.

Traditionally, datafiles that are formatted include header information that describes the content, such as data content (e.g., photograph), data format, creation date, author, creation software, version, etc. Other software may read the header information to translate, display, or embed the datafile. While this header information provides context to the data, it does not describe input data indicative of environmental or recording device settings used or measured during the gathering of the sensory data or functional operations performed on the sensory data during the editing process.

SUMMARY OF THE INVENTION

To overcome the problems of maintaining and distributing datafiles faced by content providers, historical information representing functional operations performed on sensory data is maintained. Historical data elements associated with the historical information may be applied to the sensory data, where each sensory data element may be concatenated with at least one historical data element. By maintaining the historical information, (i) the raw sensory data may be maintained in a datafile after editing, (ii) multiple datafiles for different versions are unnecessary, (iii) functional operations performed on the sensory data may be undone for repurposing the sensory data, (iv) multiple formats may be applied to the raw sensory data, and (v) the same datafile may be distributed to multiple distribution channels, for example.

The principles of the present invention include generating historical data elements and historical information based on input parameters and/or functional operations being applied to the sensory data or content. In one embodiment, at least one historical data element is concatenated to a sensory data element, and the historical information is maintained. The sensory data, historical data elements, and historical information may be stored in a single datafile.

A recording device may record the sensory data and input parameters. The recording device may apply or encode the historical data elements to the sensory data. Alternatively, a post-processing system may receive the sensory data with or without the historical information and encode the sensory data and historical data elements into a datafile. The datafile may be communicated across a network, possibly via a parser, to licensees or consumers of the content.

BRIEF DESCRIPTION OF THE DRAWINGS

A more complete understanding of the principles of the present invention may be obtained by reference to the following Detailed Description when taken in conjunction with the accompanying Drawings wherein.

DETAILED DESCRIPTION OF THE DRAWINGS

Figure 1A:
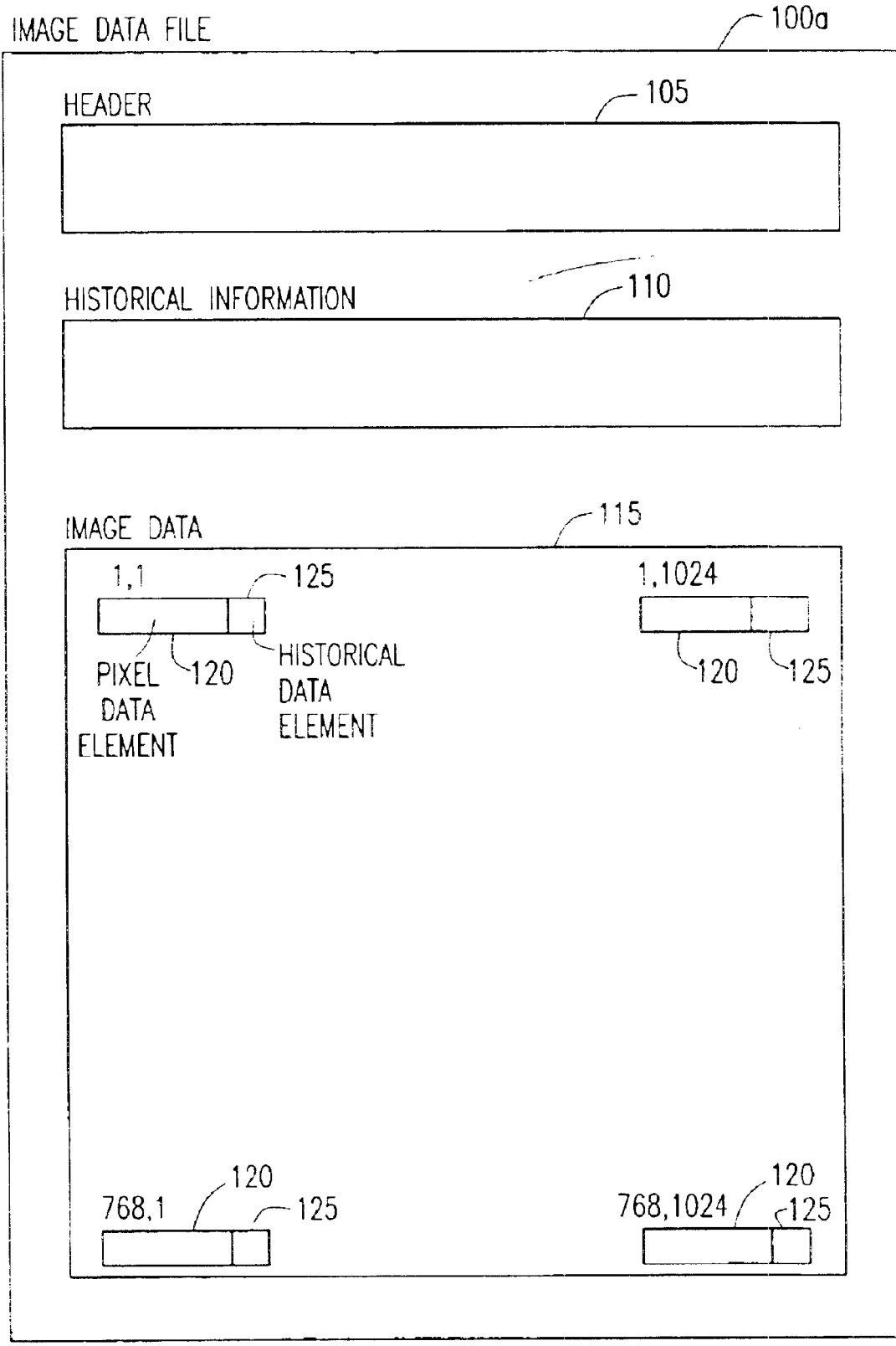
FIGS. 1A and 1B are exemplary datafiles having sensory data and associated historical data elements according to the principles of the present invention.

The principles of the present invention will now be described more fully hereinafter with reference to the accompanying drawings, in which embodiments of the invention are shown. This principles of the present invention may, however, be embodied in many different forms and should not be construed as limited to the embodiments set forth herein; rather, these embodiments are provided so that this disclosure will be thorough and complete, and will fully convey the scope of the principles of the present invention to those skilled in the art.

Content providers have a seemingly overwhelming task of gathering, editing, storing, publishing, and distributing information or content. The difficulty has been, in part, due to utilization of outdated content management systems and traditional datafile formats. With regard to the datafile formats, the advancements of network infrastructure have quite simply surpassed original intent of use of the traditional datafile formats. For example, the Internet allows for content distribution, but utilizes a different datafile format than print media systems and wireless devices.

Furthermore, traditional editing systems have become archaic in that preservation of multiple versions, including the raw data, is stored in separate datafiles. If the raw data or earlier version of the content is lost or discarded, which is often the case at large media or content providers, it may not be possible to undo from the present version to obtain original or desired content that has been altered or eliminated from the raw data. Additionally, content providers produce multiple versions of a datafile for different distribution channels and devices that the content is ultimately directed.

The principles of the present invention are generally directed to datafiles containing sensory data, historical data elements, and/or historical information. One embodiment includes each sensory data element having at least one historical data element uniquely associated therewith. The historical data element(s) are concatenated with the associated sensory data element. For example, a sensory data element having 36-bits may have at least one 8-bit historical data element concatenated or extending therefrom, where the historical data element is indicative of historical information applied to the sensory data element. The historical information may be any data representative of input data (e.g., environmental information) generated or measured at the time of creation or functional operations performed on the sensory data during an editing process. Other length historical data elements may be utilized, including concatenating historical data elements of different lengths to the associated sensory data element(s).

Another embodiment includes a datafile having sensory data and uniquely associated historical data elements, and an historical information block that contains historical information. In yet another embodiment, the historical information block is maintained outside the datafile.

The sensory data may be maintained as original data unmodified by the historical information. By maintaining the historical information and having historical data elements associated with the sensory data, a software editor may render a current version of the sensory data as modified by the historical information. The software editor may also allow a user to step through, including "undoing", different versions of the sensory data as modified by the historical data elements and associated historical information.

A recording device may be operable to capture the sensory data (e.g., image, sound, aural) and historical information that is pertinent to the captured sensory data. To capture the historical information, settings or metered data may be utilized to generate input data. The recording device may edit, store, and/or communicate the sensory data along with the historical information to an external repository or database to be stored in a datafile.

An editing software program operable to read, display, and modify the sensory data may be utilized by a human editor to edit the sensory data. The editing software program may simply render (e.g., display) the original sensory data as modified by the historical data elements associated with the historical information. Alternatively, the original data may be modified. However, by maintaining the original sensory data, it is generally possible to repurpose the content by utilizing the editing software program to undo previously performed editing on the sensory data.

The datafile may be stored in a database coupled to a server connected to a network, such as the Internet. The network may provide for multiple distribution channels for the datafile. The distribution channels may include print, web, wireless, and satellite. And, because the datafile may contain historical information specific to multiple distribution channels, a single datafile may be stored in the database for distribution to each of the multiple distribution channels.

Many devices connected to the distribution channels may be utilized to view the sensory data. Such devices may include computers, cellular telephones, personal digital assistants, and digital radios. These devices may include rendering software to render or display the sensory data as modified by the historical information. Alternatively, the devices may receive the sensory data as modified by the historical data elements without having to perform functional operations as dictated by the historical information.

One or more parsers may be incorporated along a distribution channel. The parser(s) may be utilized to modify the sensory data according to the historical data elements and historical information. For example, a personal digital assistant (PDA) may receive a different amount of data than personal computers due to network bandwidth, memory constraints, and/or screen size. Therefore, at the editing stage, the data to be sent to the personal digital assistant may be indicated by special crop marks or other indicators to be utilized by the parser(s). A licensee database coupled to the parser may contain licensee information utilized by the parser in handling the parsing and distribution of the sensory data. The licensee information may specify whether or not the licensee has privileges to edit or modify the sensory data. If the licensee does have editing privileges, hen the datafile with the sensory data, historical data elements, and historical information is communicated. Otherwise, the sensory data as modified by the historical information may be communicated to the licensee without the historical information and historical data elements.

FIG. 1A is an exemplary embodiment of a datafile 100a containing a header block 105, a data block 110 containing historical information, and a data block 115 including sensory data. The sensory data, which is image data in the instant example, includes pixel or sensory data elements that represent an image. The image data includes 768×1,024 sensory data elements as may be displayed on a computer screen. Each sensory data element 120 may be 36-bits to represent red-green-blue (RGB) colors that are 12-bits each. At least one historical data element 125 may be extended from or concatenated to the sensory data element(s) 120. The historical data element(s) 125 extended from the sensory data element 120 may or may not have the same number of bits.

The header block 105 may include general information as typically stored within an image file. Such information may include date of creation, dates of editing, data type, name of creator, ownership rights, creation software, etc. It should be understood that the header and historical information may alternatively be formed as a single block.

The historical information may include initial setting data as generated at the time that the sensory data 120 is created. For example, in the case of taking a photograph, the historical information may include light metering data, f-stop, exposure, aperture setting, etc. The historical information may further include edit history data. For example, in the case of digitally editing a photograph, functions such as crop marks, gaussian blurs, sharpen masks, etc., and associated parameters may be stored. Other image processing functions known in the art may additionally be stored as historical information. Other data, such as ownership information, digital signatures, and digital watermarks may be stored as historical information.

Although this embodiment shows image data, which may be GIF, JPEG, bitmap, MPEG, PNG, and TIFF data formats, other types of electronic data may have historical data elements 125 applied thereto. Other types of sensory data, such as audio, text, graphic, aural, video, and pressure, may utilize the techniques as described with relation to the historical information and historical data elements 125. It should be understood that combinations of data formats may utilize the principles of the present invention.

As an aside, steganography is a term that describes the process of hiding data within data so that the hidden data can be transmitted undetected. Typically, the least significant bits of data are replaced with the data to be hidden. While resolution of the data may be slightly degraded, the hidden data goes undetected by someone merely viewing the sensory data, which may represent a photograph or video. By contrast, as previously described, the historical data elements are concatenated or extended from the sensory data, and do not replace the least significant bits as is done in steganography techniques. The principles of the present invention are not intended to hide the historical data elements or historical information, but rather allow them to be available for editing and rendering purposes.

Figure 1B:
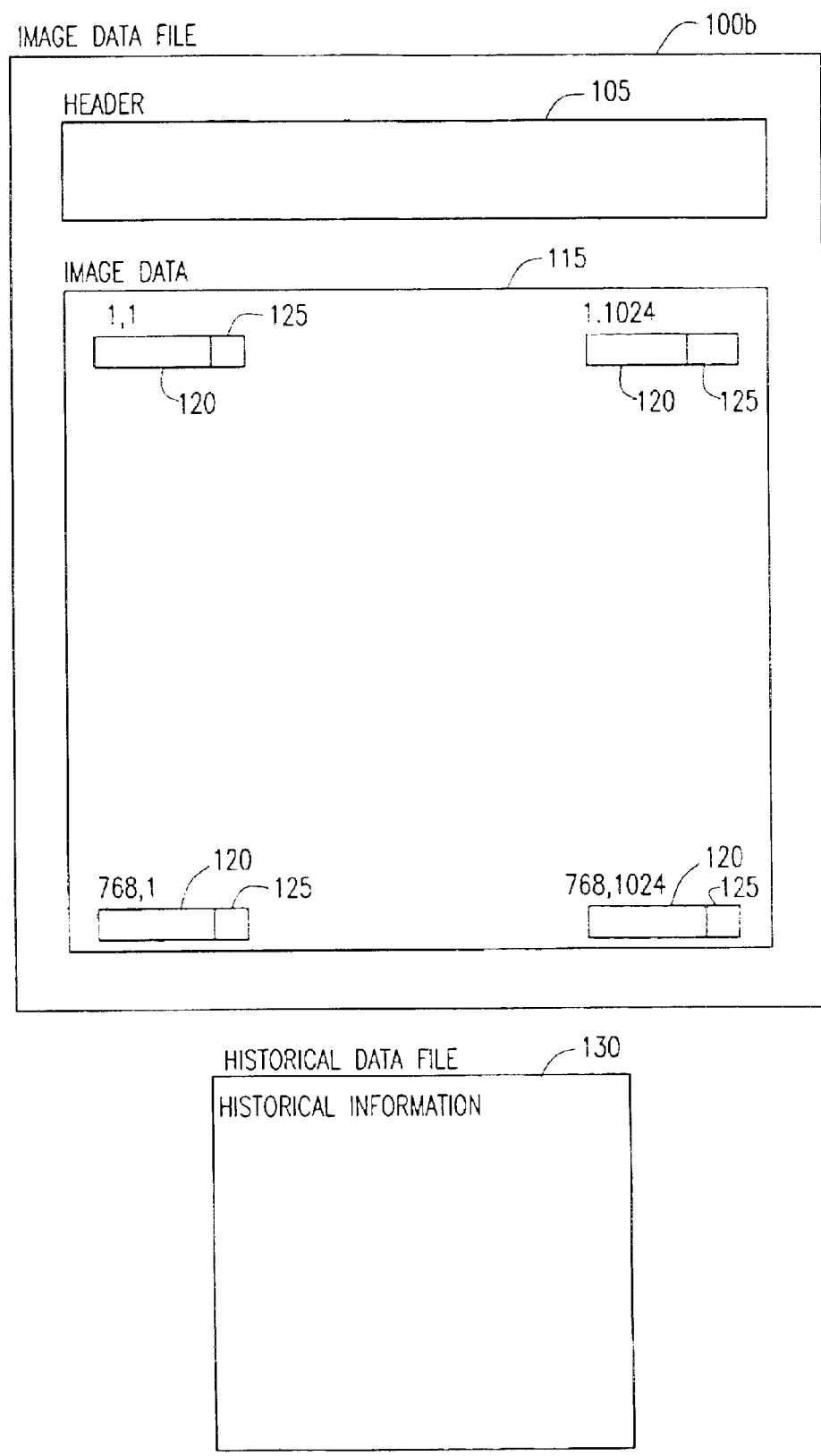

FIG. 1B is an alternative embodiment to the image datafile 100a as shown in FIG. 1A. In this embodiment, an image datafile 100b includes a header 105 and image block 115 that includes sensory data. As indicated, the image data 115 includes sensory data elements 120 and associated historical data elements 125. A history datafile 130, separate from the datafile 100b, includes the historical information as applied to the sensory data elements 120. By having the history datafile 130 separate from the image datafile, applications and distribution channels not requiring the historical information do not need to receive the history datafile 130.

While the historical data elements 125 are shown to be concatenated to or extended from the sensory data elements 120, the historical data elements 125 may be located in the same or different file without being concatenated directly with the sensory data 120. However, the historical data elements 130 would still have a unique association or one-to-one correspondence with the sensory data elements 120. By storing the historical information 110, sensory data 120, and historical data elements 125 in a single datafile, a more compact and integrated solution is provided.

Figure 2:
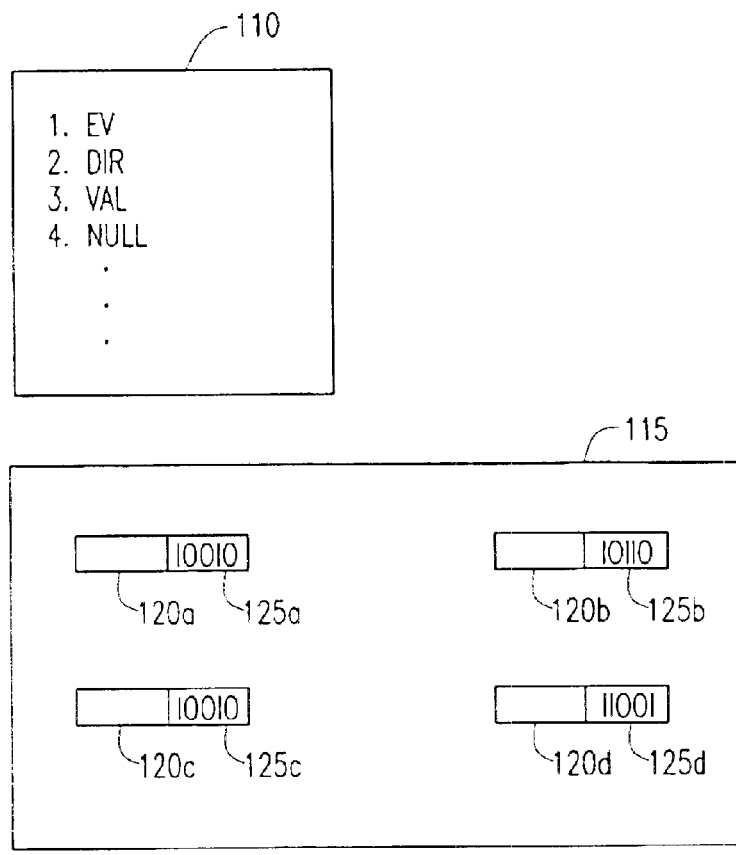
FIG. 2 is an example of applying historical information to the exemplary datafiles of FIGS. 1A and 1B.

FIG. 2 is an example of applying an historical operation to the sensory data 120. As shown in the historical information 110, an initial setting of a recording device is provided. The setting is an exposure value (EV) having two parameters, direction (DIR) and value (VAL). In applying the initial setting to the sensory data 120, the historical data elements 125 are concatenated with the sensory data 120, where each sensory data element receives a uniquely associated historical data element 125. The historical information may be considered equations or codes and the historical data elements may be considered binary values or parameters for solving the equations as applied to the associated sensory data element. A software program, such as a software editor, or hardware component, may utilize the historical information and historical data elements to render the sensory data as affected by the historical information without modifying the (raw) sensory data. Alternatively, the software program may modify the (raw) sensory data if the (raw) sensory data is not desired to be maintained.

For example, the sensory data element 120a has an historical data element (e.g., 5-bit word) concatenated therewith. In this case, the 5-bit word is "110010". The historical data element 125a is associated with the initial setting (i.e., exposure value), where the most significant bit "1" indicates that the initial setting "EV" is applied to the associated sensory data element 120a, the direction of the exposure value "0" indicates a positive value, and the value "010" represents 50 percent of a total exposure possible. Each of the sensory data elements 120b–120d have historical data elements 125b–125d that may or may not be the same as the historical data element 125a. In other words, the parameters of the exposure value (bits 2–5) may be different, as shown. A null value may be utilized to distinguish or separate historical information.

Other initial settings, such as focus value, may additionally be stored in the historical information 110, and have different historical data elements representative of the application of the historical information extending from the historical data elements 125a–125d. It should be understood that the historical information 110 may be initial settings as shown or may be functional operations applied during an editing process. Furthermore, the number of bits extended or concatenated from each of the sensory data elements 120 may be dependent upon the amount of historical information 110.

While it is possible that the amount of historical data elements may grow to be quite large given the amount of historical information generated for a given datafile, it is possible to use compression techniques to reduce the amount of historical data elements being stored. The compression techniques may be applied as understood in the art.

Figure 3:
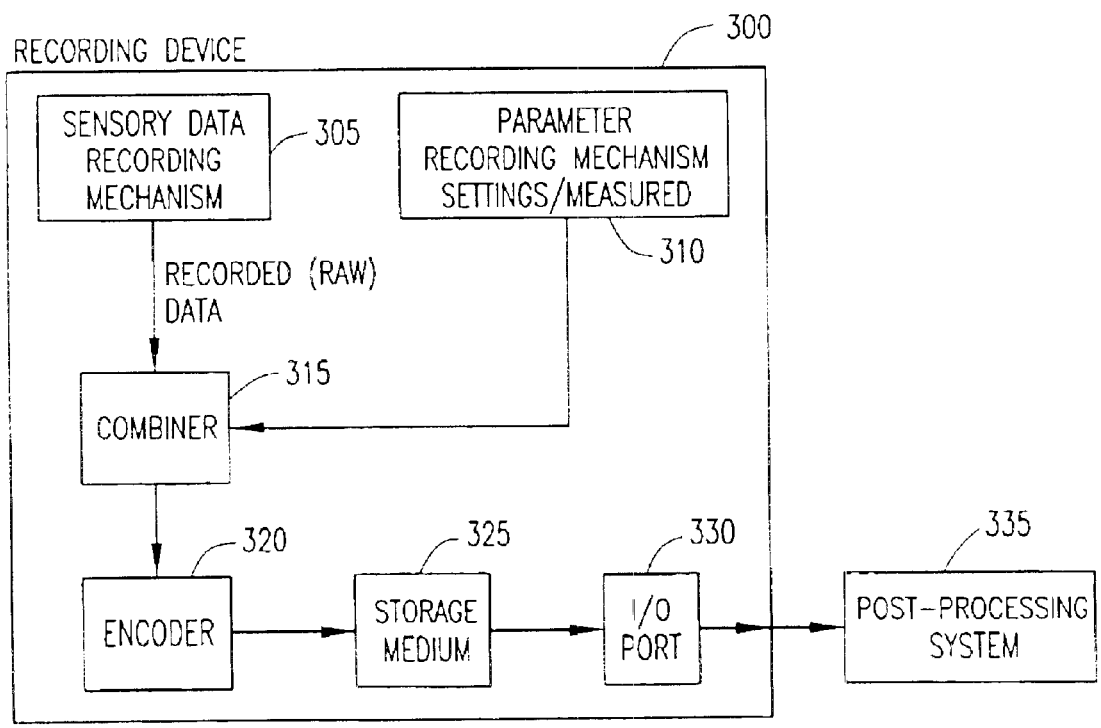
FIG. 3 is an exemplary recording device for recording sensory data and generating the exemplary datafiles of FIGS. 1A and 1B.

FIG. 3 is an exemplary embodiment of a recording device 300 for generating sensory data and associated historical information. The recording device 300 may be a digital camera, digital scanner, digital video recorder, digital audio recorder, digital aural recorder, or any other digital electronic recording device. The recording device 300 includes a sensory data recording mechanism 305, which may be a microphone in the case of a digital audio recorder or a CCD sensor with associated optics in the case of a digital camera or digital video recorder. The recording device 300 further includes a parameter recording mechanism 310 that records input parameters, which include either (i) settings that are automatically or manually set on the recording device 300 or (ii) measured environmental parameters (e.g., light intensity) that are measured by a light meter, for example.

A combiner 315 is coupled to both the sensory data recording mechanism 305 and the parameter recording mechanism 310. The combiner 315 may be further coupled to an encoder 320. The combiner 315 and encoder 320 may be hardware components. In another embodiment, the combiner 315 and the encoder 320 are software modules operating within a processor (not shown). The encoder 320 is coupled to a storage medium 325, which may be electronic memory, optical memory, or magnetic memory. An I/O port 330, which may be coupled to the storage medium 325 or processor, may be utilized to connect to an external system 335.

In operation, the recording device 300 operates to record sensory data, such as visual and/or audio data. The sensory data recording mechanism 305 records/measures the sensory data. The parameter recording mechanism 310 records/measures input parameters, such as environmental parameters (e.g., light, time, etc.) and recording device settings (e.g., f-stop). The recorded (raw) data and parameters are combined by the combiner 315 and transmitted to the encoder 320. The encoder 320 may form a datafile as embodied in FIG. 1. Alternatively, the recorded (raw) data and input parameters may be transmitted to an post-processing system 335 and encoded by the post-processing system 335. The datafile is then stored in the post-processing system 335 or on the storage medium 325.

Figure 4:
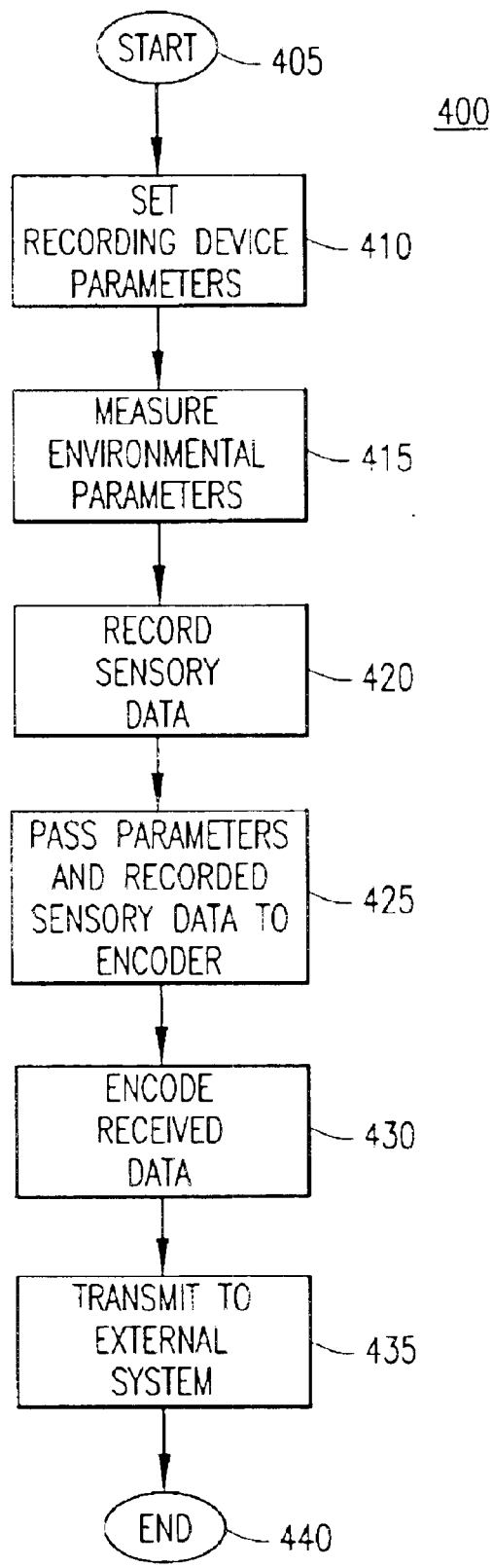
FIG. 4 is an exemplary flow chart describing operation of the exemplary recording device of FIG. 3.

FIG. 4 is an exemplary flow diagram for generating files using the data recording device 300. The process starts at step 405. At step 410, recording device parameters are set. The recording device parameters may be volume and balance for an audio recording device or white balance, exposure, and focus for a visual recording device. At step 415, environmental parameters are measured. The environmental parameters may be noise level for an audio recording device or light intensity for a visual recording device.

At step 420, sensory data is recorded by the recording device. At step 425, input parameters and recorded sensory data are passed to the encoder 320. The encoder 320 encodes the sensory data with the setting and measured parameters at step 430, whereby the parameters may be stored as historical information, and the sensory data may have historical data elements appended thereto. At step 435, the encoded data, including sensory and historical information data, is transmitted to the post-processing system 335 for editing, storing, and distributing, for example. At step 440, the process ends.

Figure 5:
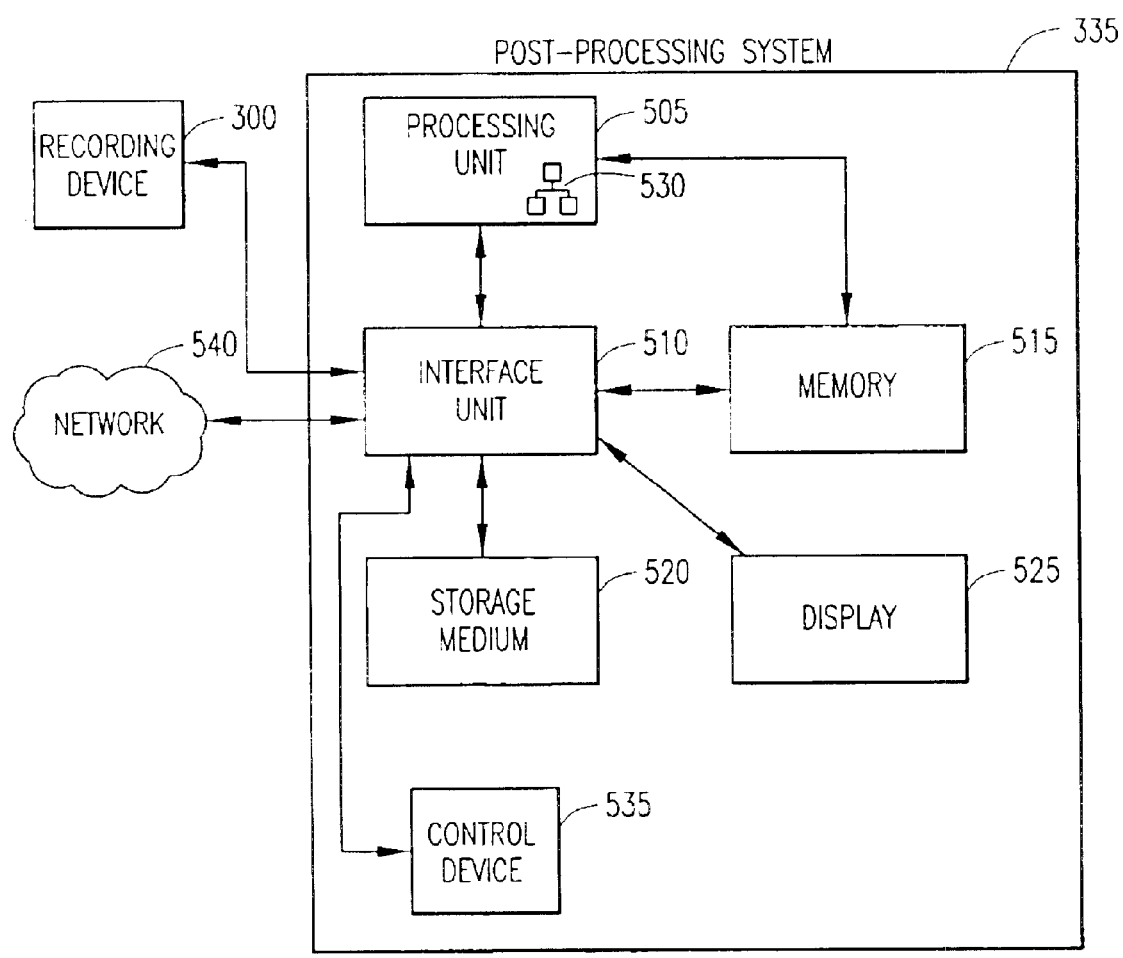
FIG. 5 is an exemplary post-processing system for performing editing operations on the exemplary datafiles of FIGS. 1A and 1B.

FIG. 5 is an exemplary post-processing system 335 for generating datafiles having historical information stored with the sensory data. The post-processing system 335 includes a processing unit 505 coupled to an interface unit 510 and a memory 515. A storage medium 520 is further coupled to the interface unit 510. A display 525, which may be part of or coupled to the post-processing system 335, is further coupled to the interface unit 510.

The processing unit 505 may operate software 530 to perform the function of generating datafiles from sensory and input parameter data received from the recording device 300. The generation of the datafiles include combining and encoding operations to associate the historical data elements with the sensory data. The software 530 may be operated by a control device, such as a computer mouse, coupled to the interface unit 510. The control device 535 may be used to select editing functions to be performed on the sensory data. If the recording device 300 is not capable of providing input parameter data, then the post-processing system 335 may format a datafile without historical information or with historical information other than that provided by input parameter data. The datafile may be stored in the storage medium 520 and/or transmitted to a network 540.

Figure 6:
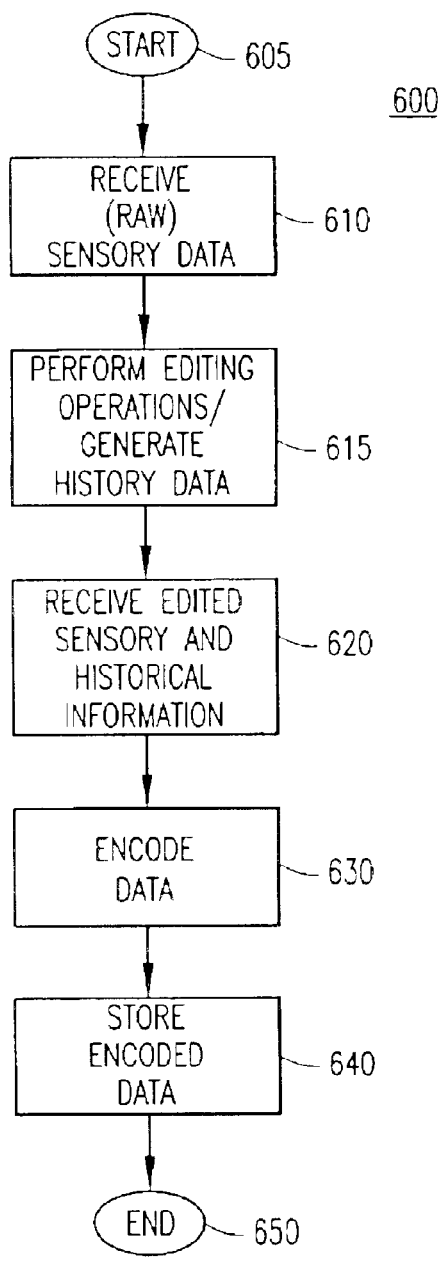
FIG. 6 is an exemplary flow chart for describing the editing operations of the post-processing system of FIG. 5.

FIG. 6 is an exemplary flow diagram 600 for performing post-processing operations on the sensory data received by the recording device 300 on the post-processing system 335. The process starts at 605. At step 610, the (raw) sensory data is received. The data does not include sensory data as the recording device that recorded the sensory data did not include functionality for generating input parameter data. At step 615, editing operations are performed on the sensory data. The editing operations performed may generate historical information to be associated with the sensory data. At step 620, the edited sensory and historical information are received by an encoder, for example, to apply or encode historical data elements to the sensory data. The sensory data and historical data elements are encoded by concatenating the historical data elements to the sensory data at step 630, and stored at step 640. The process ends at step 650.

Figure 7:
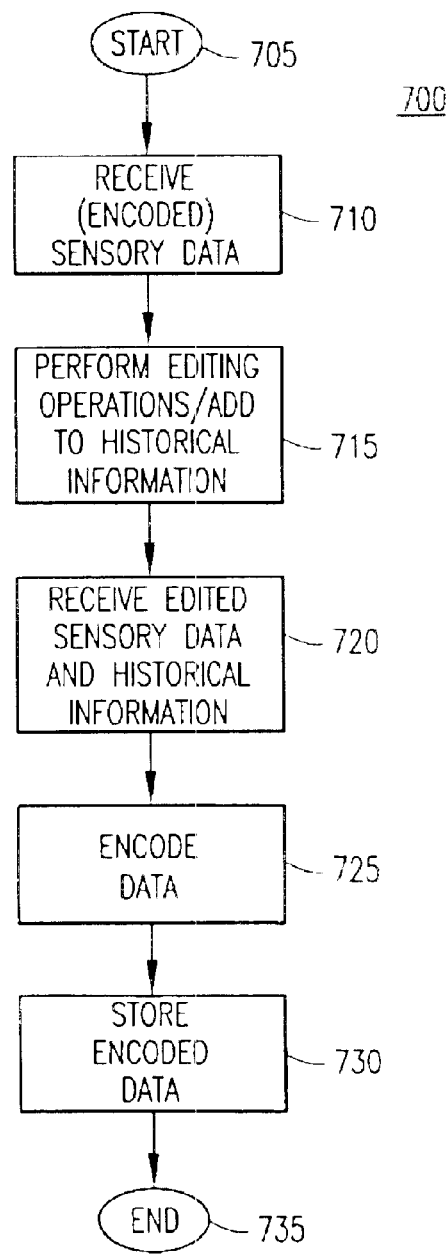
FIG. 7 is another exemplary flow chart describing the editing operations of the post-processing system of FIG. 5.

FIG. 7 is an exemplary flow diagram for editing a sensory datafile. The process starts at step 705. At step 710, sensory data, which is encoded with historical data elements, is received by the post-processing system 335 that operates software 530 capable of editing and generating sensory data having encoded historical data elements. At step 715, editing operations are performed, where the editing operations may be added to historical information of the sensory datafile and associated with the sensory data by concatenating historical data elements therewith by the encoder 320.

At step 720, the edited sensory data and historical information may be received by the encoder 320. The edited sensory data may be the raw sensory data unmodified by the editing operations. In other words, the editing operations may cause the editing software to merely render the sensory data as modified by the editing operations, but maintain the sensory data in its original, raw form as recorded by the recording device 300.

At step 725, the sensory data and historical information are encoded. The encoding process utilizes the functional operations performed on the sensory data and concatenates historical data elements 125 to individual sensory data elements 120 as affected by the historical information. The historical information, which is representative of the functional operations, may also be encoded into the datafile. The datafile is stored at step 730 and the process ends at step 735.

Figure 8:
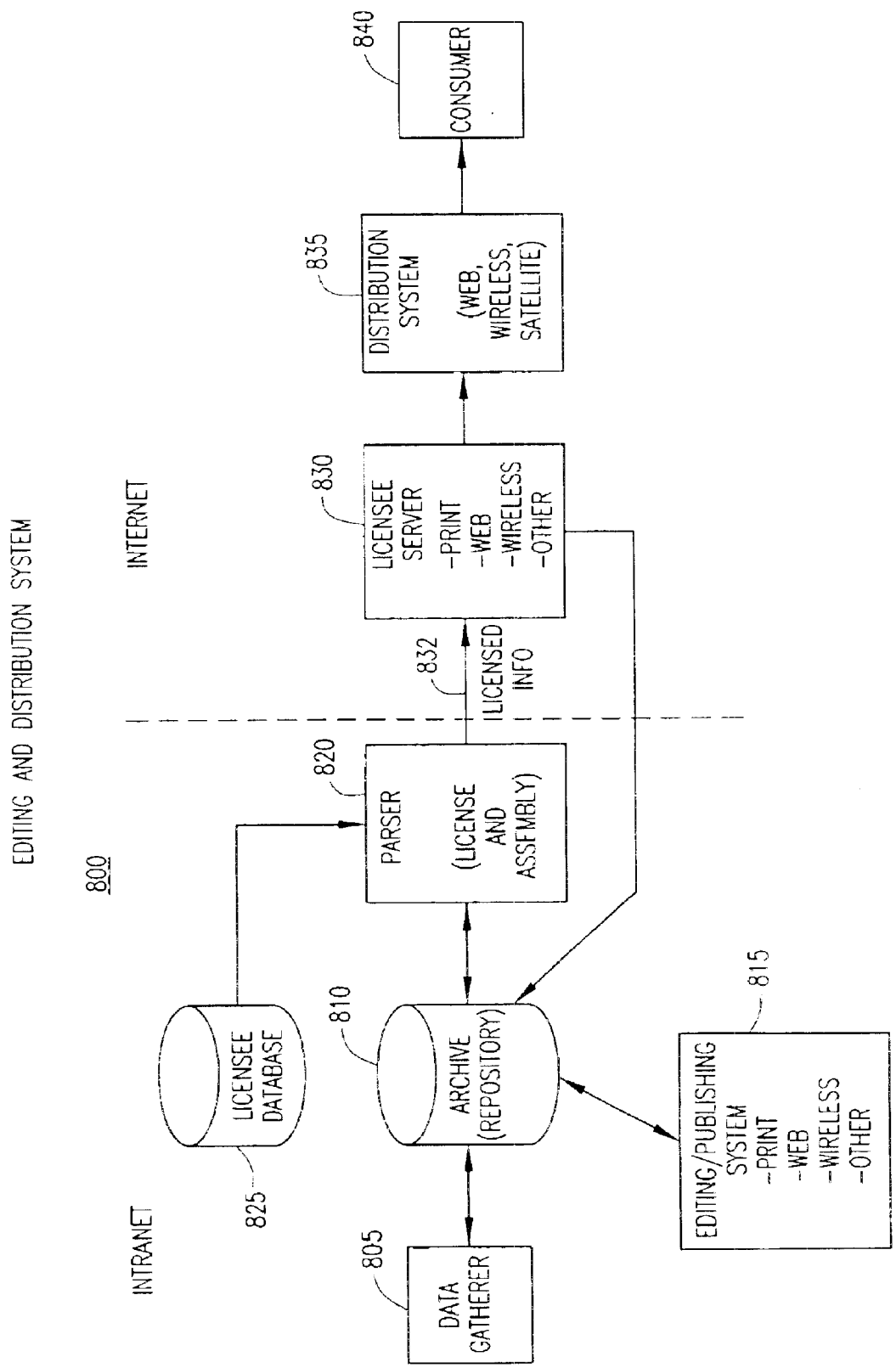
FIG. 8 is an exemplary editing and distribution system block diagram for gathering, editing, storing, and distributing the exemplary datafiles of FIGS. 1A and 1B.

FIG. 8 is an exemplary editing and distributing system 800 for collecting, editing, and distributing the datafiles including the sensory and associated historical data elements and/or historical elements. A data gatherer 805, which may be the recording device 300 (FIG. 3) or other digital or analog data gathering system. The data gatherer is coupled to an archive or repository 810 for storing data recorded by the data gatherer 805. An editing or publishing system 815, which may be the post-processing system 335 (FIG. 5), is further coupled to the archive 810. A parser 820 may also be coupled to the archive 810. Alternatively, the parser may be coupled to the editing system 815. A licensee database 825 may be coupled to the parser 820. As indicated by the dashed line, the elements 805-825 may be located on an Intranet as operated by a content provider. Alternatively, other networking configurations may be utilized to collect, store, edit, and parse the sensory data, historical data elements, and historical information.

A licensee server 830 may be coupled to the parser 820 via an Internet connection 832. The licensee server 830 may be coupled to a distribution system 835. The distribution system 835 may be the Internet, a wireless network, or a satellite network, for example. A consumer 840 may be coupled to the distribution system 835, where the consumer may be any consumer device, such as computer, mobile telephone, handheld computer, and personal digital assistant (PDA), for example.

Figure 9:
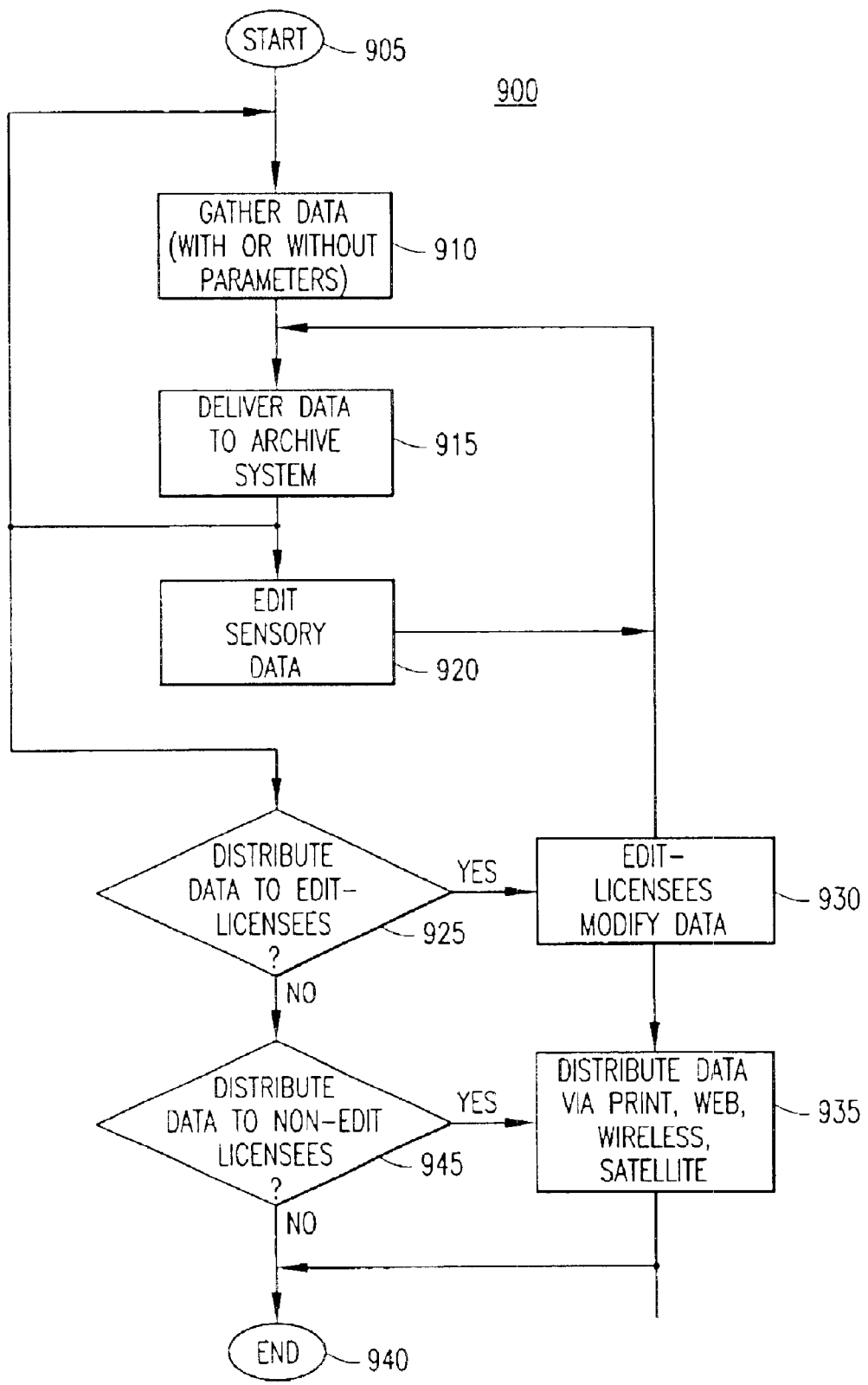
FIG. 9 is an exemplary flow chart describing the operation of the system of FIG. 8.

FIG. 9 is an exemplary flow chart 900 for describing operation of the editing and distribution system of FIG. 8. The process starts at step 905. At step 910, data is gathered with or without input parameters (i.e., setting or measured parameters) that are represented by historical information. At step 915, the gathered data is delivered to the archive system 810. The process may loop as sensory data is further gathered.

At step 920, the sensory data is edited. In the editing process, the sensory data may not be affected from its original recorded state, but may be rendered by a software editor according to the functional operations applied thereto. Additionally, in the editing process, the software editor may effectively undo editing that has been previously performed on the sensory data. Because the sensory data may be edited and unedited due to the associated historical data elements being associated with the sensory data and the historical information being available, the sensory data may be repurposed for different uses and/or for different distribution channels that the sensory data had not previously been directed. The edited sensory data may then be returned to the archive system 810.

At step 925, a query may be performed to determine whether the datafile is to be distributed to an edit licensee. An edit licensee is a licensee of the content stored in the datafile who has permission to edit the content. If the licensee is allowed to edit the content, then the licensee receives sensory data, historical data elements, and historical information, and may modify the content at step 930 by using a post-processing system. Upon completion of the editing by the edit licensee, the data may be delivered back to the archive system 810. The datafile may additionally be distributed by the licensee via print, web, wireless, or satellite networks, for example, at step 935. The process ends at step 940.

If the licensee is not allowed to edit the content, then a query is performed to determine whether the datafile is to be distributed to the non-edit licensee at step 945. If the datafile is to be distributed to non-edit licensees, then the datafile may be (i) rendered by the parser 820 to provide a datafile without historical data elements or historical information, (ii) communicated to the non-edit licensee, and (iii) distributed by the licensee via a network at 935. The process ends at step 940.

The previous description is of at least one embodiment for implementing the invention, and the scope of the invention should not necessarily be limited by this description. The scope of the present invention is instead defined by the following claims.

What is claimed is:

1. A system for associating historical information with corresponding sensory data received from a recording device and for performing functional operations on the sensory data, the sensory data including a plurality of sensory data elements, said system comprising:
    a memory for storing the sensory data and associated historical information;
    a display for viewing the sensory data stored in the memory;
    a computing device coupled to said memory and said display, said computing device operable to generate a plurality of historical data elements corresponding to the historical information, at least one historical data element being uniquely associated with a corresponding sensory data element; and
    an input device coupled to said computing device for selecting a functional operation to be applied to at least one sensory data element, said computing device forming at least one historical data element and corresponding historical information.

2. The system according to claim 1, wherein the sensory data includes at least one of the following:
    visual, auditory, aural, pressure, and temperature.

3. The system according to claim 1, wherein the historical information includes data representative of the functional operations performed on at least one sensory data element.

4. The system according to claim 1, wherein the historical data elements are binary values corresponding to the historical information.

5. The system according to claim 1, wherein each of the at least one historical data element is concatenated with the uniquely associated sensory data element.

6. The system according to claim 1, wherein the sensory data remains unmodified.

7. The system according to claim 1, wherein said computing device renders the sensory data according to the historical data elements and corresponding historical information.

8. A system for preserving historical operations associated with sensory data, the system comprising:
    a memory for storing the sensory data and historical information representative of the historical operations;
    a processor, coupled to said memory, operable to generate the historical information based upon the historical operations being performed, said processor further generating historical data elements associated with the historical information, and corresponding the historical data elements to the sensory data; and
    a storage medium coupled to said processor for storing the sensory data, historical information, and historical data elements.

9. The system according to claim 8, wherein the sensory data includes a plurality of sensory data elements having at least one historical data element corresponding therewith.

10. The system according to claim 9, wherein the at least one historical data element is appended to a corresponding sensory data element.

11. The system according to claim 8, further comprising a data port, coupled to said processor, operable to communicate the sensory data.

12. The system according to claim 8, further comprising a display, coupled to said processor, for displaying at least a portion of the sensory data as affected by the historical operations.

13. The system according to claim 8, wherein the sensory data and historical data elements are stored in a datafile.

14. A method for maintaining functional operations applied to sensory data, the method comprising:
forming a plurality of first and second data fields having one-to-one correspondence, a first data field including a sensory data element, and a second data field including an historical data element corresponding to at least one functional operation performed on the sensory data element; and
storing the plurality of first and second data fields.

15. The method according to claim 14, wherein the first and second data fields are concatenated.

16. The method according to claim 14, further comprising generating indicia representative of the at least one functional operation.

17. The method according to claim 16, further comprising generating an end-of-operation identifier after said generating indicia.

18. The method according to claim 14, wherein the sensory data is unaltered by the at least one functional operation.

19. The method according to claim 14, wherein the historical data element is indicative of applicability of the corresponding at least one functional operation to the corresponding sensory data element.

20. A system for generating sensory data and historical information, the system comprising:
means for recording sensory information;
means for converting the sensory information into sensory data;
at least one measuring device, associated with said means for recording, for measuring input parameters while recording the sensory information;
a processing unit coupled to said at least one measuring device, said processing unit generating historical information and associated historical data elements based on the measured input parameters, said processing unit further corresponding the historical data elements with the sensory data, the historical data elements being indicative of applicability of the associated historical information to the corresponding sensory data;
memory coupled to said processing unit, for storing the sensory data and historical data elements; and
a communication port, coupled to said processing unit, for communicating the sensory data and historical data elements.

21. The system according to claim 20, wherein the sensory data includes a plurality of sensory data elements, at least one sensory data element having at least one historical data element concatenated thereto.

22. The system according to claim 21, wherein the at least one historical data element is a binary value indicative of applicability of the generated historical information to at least one sensory data element.

23. The system according to claim 22, wherein the sensory information is at least one of the following:
visual, auditory, aural, pressure, and temperature.

24. The system according to claim 20, wherein the historical information includes functional operations performed on the sensory data.

25. The system according to claim 20, wherein the sensory data, historical information, and historical data elements are stored in a single datafile.

26. A system for performing functional operations on sensory data and maintaining the functional operations applied to the sensory data as historical information, the system comprising:
a processor;
software, operating on said processor, for performing the functional operations on at least one sensory data element, said processor generating historical information representative of the functional operations, and at least one historical data element associated with the historical information, the at least one historical data element further being associated with the at least one sensory data element; and
a display coupled to said processor, for displaying a rendered image of the sensory data as modified by the functional operations.

27. The system according to claim 26, wherein the at least one historical data element is concatenated to the at least one sensory data element.

28. The system according to claim 26, wherein the sensory data is unmodified.

29. A computer-readable medium having stored thereon sequences of instructions, the sequences of instructions, when executed by a processor, causes the processor to:
perform a functional operation on at least one sensory data element;
generate at least one historical information data element representative of the functional operation;
generate an historical data element associated with the at least one historical information data element; and
concatenate the historical data element with the at least one sensory data element.

30. The computer-readable medium according to claim 29, wherein the sequences of instructions further cause the processor to render the at least one sensory data element as altered by the functional operation.

31. A system for distributing a sensory datafile having historical information associated therewith, the system comprising:
a network for communicating information between at least two points coupled to said network; and
a server, located at a first point, operable to communicate a datafile including sensory data and historical data elements, at least one historical data element being concatenated to a sensory data element and indicative of at least one functional operation performed on the sensory data element.

32. The system according to claim 31, wherein the datafile further includes historical information representative of the functional operations.

33. The system according to claim 31, further comprising a parser, in communication with said server, operable to modify the sensory data according to said historical data elements and at the at least one functional operation.

34. The system according to claim 33, wherein the sensory data is unmodified.

35. The system according to claim 33, further comprising a database, coupled to said parser, for storing information representative of permission for a licensee to modify the datafile.

36. The system according to claim 31, wherein said network includes one of a local area network, wide area network, wireless network, and the Internet.

37. A method for generating a sensory datafile being capable of maintaining a plurality of functional operations applied to sensory data, said method comprising:

receiving the sensory data;

generating historical information representative of a functional operation applied to at least one sensory data element; and appending at least one historical data element to the at least one sensory data element, the at least one historical data element identifying applicability of the historical information to the associated at least one sensory data element.

38. The method according to claim 37, wherein each of the sensory data elements is appended by at least one historical data element.

39. A system, comprising:

a computing device operable to receive a datafile including sensory data and associated historical information, the historical information being representative of functional operations applied to at least one sensory data element.

40. The system according to claim 39, wherein the sensory data includes a plurality of sensory data elements, each sensory data element having at least one historical data element appended thereto, and indicative of at least one historical information data element being applied to the associated sensory data element.

41. The system according to claim 39, wherein said computing device is further operable to render the sensory data as affected by the historical information.

42. The system according to claim 39, wherein said computing device further is operable to undo historical information applied to the sensory data.

* * * * *

UNITED STATES PATENT AND TRADEMARK OFFICE
CERTIFICATE OF CORRECTION

PATENT NO.    : 6,862,556 B2
DATED         : March 1, 2005
INVENTOR(S)   : James C. Jennings et al.

It is certified that error appears in the above-identified patent and that said Letters Patent is hereby corrected as shown below:

Column 1,
Lines 66-67, replace "network and is display resolution" with -- network and display resolution --.

Column 6,
Line 53, replace "word is "110010"" with -- word is "10010" --.

Signed and Sealed this

Twentieth Day of December, 2005

JON W. DUDAS
*Director of the United States Patent and Trademark Office*